(12) United States Patent
Kuwabara

(10) Patent No.: US 10,793,221 B2
(45) Date of Patent: Oct. 6, 2020

(54) FRONT STRUCTURE FOR STRADDLE-TYPE VEHICLE

(71) Applicant: HONDA MOTOR CO., LTD., Minato-ku, Tokyo (JP)

(72) Inventor: Naoki Kuwabara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 16/010,635

(22) Filed: Jun. 18, 2018

(65) Prior Publication Data
US 2019/0023342 A1 Jan. 24, 2019

(30) Foreign Application Priority Data
Jul. 19, 2017 (JP) ................. 2017-140275

(51) Int. Cl.
*B62K 25/08* (2006.01)
*B62J 23/00* (2006.01)
*B62K 25/24* (2006.01)
*B62J 17/00* (2020.01)
*B62K 11/04* (2006.01)
*B62K 21/02* (2006.01)
*B62K 25/04* (2006.01)

(52) U.S. Cl.
CPC .............. *B62K 25/08* (2013.01); *B62J 17/00* (2013.01); *B62J 23/00* (2013.01); *B62K 25/24* (2013.01); *B62K 11/04* (2013.01); *B62K 21/02* (2013.01); *B62K 2025/044* (2013.01)

(58) Field of Classification Search
CPC ..................................................... B62K 25/16
See application file for complete search history.

(56) References Cited

U.S. PATENT DOCUMENTS

| 4,179,135 A * | 12/1979 | Slater ..................... B62K 25/24 280/276 |
| 9,902,313 B2 * | 2/2018 | Taguma .................... B62J 6/04 |
| 2010/0200322 A1 | 8/2010 | Lawson |
| 2010/0259026 A1 * | 10/2010 | Patmont ................ B62K 25/16 280/124.169 |
| 2015/0274249 A1 | 10/2015 | Kuwabara et al. |

(Continued)

FOREIGN PATENT DOCUMENTS

| CA | 1275940 | 11/1990 |
| CA | 2924948 | 4/2015 |

(Continued)

OTHER PUBLICATIONS

Extended European Search Report for European Patent Application No. 18179771.3 dated Dec. 14, 2018.

(Continued)

*Primary Examiner* — Kevin Hurley
(74) *Attorney, Agent, or Firm* — Amin, Turocy & Watson, LLP

(57) ABSTRACT

A front structure for a straddle-type vehicle includes a front cushion unit supported by a support shaft installed between a pair of left and right arms of a straddle-type vehicle while being disposed at a position behind a front wheel steering shaft of the straddle-type vehicle and above an engine, and a cover that covers a space between the pair of left and right arms between the front wheel steering shaft and the front cushion unit.

10 Claims, 9 Drawing Sheets

(56) References Cited

U.S. PATENT DOCUMENTS

| | | | | |
|---|---|---|---|---|
| 2016/0280308 A1* | 9/2016 | Taguma | ............... | B62K 21/02 |
| 2016/0280314 A1* | 9/2016 | Taguma | ............... | B60G 15/00 |
| 2016/0288868 A1* | 10/2016 | Aoki | ............... | B62K 11/12 |
| 2017/0088230 A1* | 3/2017 | Kuwabara | ............ | B62K 21/02 |
| 2018/0244336 A1* | 8/2018 | Kuwabara | ............... | B62J 6/20 |

FOREIGN PATENT DOCUMENTS

| | | |
|---|---|---|
| CA | 2971376 | 8/2016 |
| CN | 1840423 | 10/2006 |
| CN | 101868401 | 10/2010 |
| CN | 104487329 | 4/2015 |
| DE | 10205289 | 8/2003 |
| EP | 3072796 | 9/2016 |
| JP | 62-033983 | 2/1987 |
| JP | 10-236364 | 9/1998 |
| JP | 2000-168667 | 6/2000 |
| JP | 2011-201335 | 10/2011 |
| JP | 2015-193310 | 11/2015 |
| JP | 2016-000600 | 1/2016 |
| WO | 2017/051614 | 3/2017 |

OTHER PUBLICATIONS

Canadian Office Action for Canadian Patent Application No. 3008543 dated Jun. 4, 2019.
Japanese Office Action for Japanese Patent Application No. 2017-140275 dated Mar. 12, 2019.
Chinese Office Action for Chinese Patent Application No. 201810766615.3 dated Feb. 3, 2020.

* cited by examiner

FRONT STRUCTURE FOR STRADDLE-TYPE VEHICLE

CROSS-REFERENCE TO RELATED APPLICATION

Priority is claimed on Japanese Patent Application No. 2017-140275, filed Jul. 19, 2017, the content of which is incorporated herein by reference.

BACKGROUND OF THE INVENTION

Field of the Invention

The present invention relates to a front structure for a straddle-type vehicle.

Description of Related Art

In the related art, for example, a straddle-type vehicle as disclosed in Japanese Unexamined Patent Application, First Publication No. 2000-168667 is known. The straddle-type vehicle includes a front damper disposed on a vehicle front section and behind a steering arm. In the straddle-type vehicle disclosed in Japanese Unexamined Patent Application, First Publication No. 2000-168667, as a knuckle integrally extends from an axle holder block and the steering arm is connected to the knuckle, steering of a front wheel is performed. In the straddle-type vehicle disclosed in Japanese Unexamined Patent Application, First Publication No. 2000-168667, as the front damper is disposed behind the steering arm and below the vehicle body and is covered with a front fender, a leg shield, and so on, appearance characteristics and aerodynamic performance are secured.

SUMMARY OF THE INVENTION

Incidentally, when a suspension is disposed behind the steering shaft and above the vehicle body, problems may occur in appearance characteristics and aerodynamic performance around the suspension.

The present invention is directed to improving appearance characteristics and aerodynamic performance in a front structure for a straddle-type vehicle in which a suspension is disposed behind a steering shaft and above a vehicle body.

(1) A front structure for a straddle-type vehicle according to an aspect of the present invention includes a suspension supported by a support shaft installed between a pair of left and right arms of a straddle-type vehicle while being disposed at a position behind a steering shaft of the straddle-type vehicle and above a power source of the straddle-type vehicle; and a cover configured to cover a space between the pair of left and right arms between the steering shaft and the suspension.

(2) In the aspect of the above mentioned (1), a front section of the cover may be fixed to a cylindrical holder configured to pivotably support the steering shaft by a first fixing member.

(3) In the aspect of the above mentioned (2), the front section of the cover may be fixed to the holder from behind by a pair of left and right first fixing members.

(4) In the aspect of any one of the above mentioned (1) to (3), a suspension insertion hole through which the suspension is inserted may be formed in the cover.

(5) In the aspect of any one of the above mentioned (1) to (4), a rear section of the cover may be fixed to the suspension by a second fixing member.

(6) In the aspect of the above mentioned (5), the rear section of the cover may be fixed to the suspension from behind by the second fixing member.

(7) In the aspect of any one of the above mentioned (1) to (6), the cover may have flexibility, and a bent section curved along the cylindrical holder, which is configured to pivotably support the steering shaft, and the arm may be formed in the cover.

(8) In the aspect of any one of the above mentioned (1) to (7), the suspension may be an electronic control suspension having a connecting section, and a connecting section insertion hole through which the connecting section is inserted may be formed in the cover.

(9) In the aspect of any one of the above mentioned (1) to (8), the cover may include: a first wide section spreading in a vehicle width direction while extending upward and downward along a rear section of the cylindrical holder configured to pivotably support the steering shaft; a second wide section spreading in the vehicle width direction to cover upper surfaces of the pair of left and right arms while extending rearward from a lower end of the first wide section; and a rearward extension section extending from a rear end of the second wide section toward a rear end of a lower section of the suspension.

(10) In the aspect of the above mentioned (9), the rearward extension section may include: a first extension section extending rearward and downward from the rear end of the second wide section; and a second extension section extending forward and downward from a rear end of the first extension section, and the second extension section may extend in an axial direction of the suspension.

(11) In the aspect of any one of the above mentioned (1) to (10), the arm may be a lower arm extending in a vehicle forward-rearward direction while being connected to a lower section of the cylindrical holder configured to pivotably support the steering shaft.

According to the aspect of the above mentioned (1), since the space between the pair of left and right arms is hidden at a front position of the suspension as the cover configured to cover the space between the pair of left and right arms is installed between the steering shaft and the suspension, appearance characteristics can be improved. In addition, since the gap between the pair of left and right arms is covered with the cover, downward escape of an airflow from the front through the space between the pair of left and right arms can be minimized. Since an increase in resistance can be minimized by suppressing downward escape of the airflow, aerodynamic performance can be improved. Accordingly, in the front structure for a straddle-type vehicle in which the suspension is disposed behind the steering shaft and above the vehicle body, appearance characteristics and aerodynamic performance can be improved.

According to the aspect of the above mentioned (2), since the front section of the cover is fixed to the cylindrical holder configured to pivotably support the steering shaft by the first fixing member, turning-up of the front section of the cover due to the traveling airflow can be minimized.

According to the aspect of the above mentioned (3), since the front section of the cover is fixed to the holder from behind by the pair of left and right first fixing members, the following effects are exhibited. Hypothetically, when the front section of the cover is fixed to the holder from the front by the pair of left and right first fixing members, an attachment portion of the first fixing member disposed on the front section of the holder may exert an influence on a flow of air from the front, and a problem in aerodynamic performance may occur. On the other hand, when the front section of the cover is fixed to the holder from behind by the pair of left and right first fixing members, it is unlikely that the flow of air from the front is influenced by the first fixing member disposed on the rear section of the holder. In addition, since the first fixing member can be fixed from the side of the cover, workability can be improved. In addition, in comparison with the case in which the front section of the cover is fixed by only a single fixing member, since the front section of the cover can be firmly fixed to the holder, turning-up of the front section of the cover due to the traveling airflow can be more effectively minimized.

According to the aspect of the above mentioned (4), since the suspension insertion hole through which the suspension is inserted is formed in the cover, the gap around the suspension can be made as small as possible by inserting the suspension through the suspension insertion hole. Accordingly, appearance characteristics and aerodynamic performance can be further improved.

According to the aspect of the above mentioned (5), since the rear section of the cover is fixed to the suspension by the second fixing member, it is possible to suppress the flapping of the cover due to the traveling airflow.

According to the aspect of the above mentioned (6), since the second fixing member can be fixed from the side of the cover as the rear section of the cover is fixed to the suspension from behind by the second fixing member, workability can be improved.

According to the aspect of the above mentioned (7), since the cover follows movement of the arm as the cover has flexibility and the bent section curved along the cylindrical holder, which is configured to pivotably support the steering shaft, and the arm is formed in the cover, the gap generated upon swinging of the arm can be covered with the cover. Accordingly, appearance characteristics and aerodynamic performance can be improved even when the arm is swung.

According to the aspect of the above mentioned (8), since the suspension is the electronic control suspension having the connecting section and the connecting section insertion hole through which the connecting section is inserted is formed in the cover, the gap around the connecting section can be made as small as possible by inserting the connecting section through the connecting section insertion hole. Accordingly, appearance characteristics and aerodynamic performance can be improved even in the electronic control suspension having the connecting section.

According to the aspect of the above mentioned (9), as the cover includes the first wide section spreading in the vehicle width direction while extending upward and downward along the rear section of the cylinder holder configured to pivotably support the steering shaft, a second wide section spreading in the vehicle width direction to cover the upper surfaces of the pair of left and right arms while extending rearward from the lower end of the first wide section and the rearward extension section extending from the rear end of the second wide section toward the rear end of the lower section of the suspension, since the gap around the suspension can be made as small as possible by the first wide section, the second wide section and the rearward extension section, appearance characteristics can be further improved. In addition, since the gap between the upper surfaces of the pair of left and right arms in the vehicle width direction is covered with the second wide section and the airflow from the front can smoothly flow along the second wide section, aerodynamic performance can be further improved.

According to the aspect of the above mentioned (10), since the rearward extension section includes the first extension section extending rearward and downward from the rear end of the second wide section and the second extension section extending forward and downward from the rear end of the first extension section, and the second extension section extends in the axial direction of the suspension, the cover can be attached regardless of expansion and contraction of the suspension.

According to the aspect of the above mentioned (11), since the arm is the lower arm extending in the vehicle forward-rearward direction while being connected to the lower section of the cylindrical holder configured to pivotably support the steering shaft, appearance characteristics and aerodynamic performance around the lower arm can be improved.

DETAILED DESCRIPTION OF THE INVENTION

Figure 1:
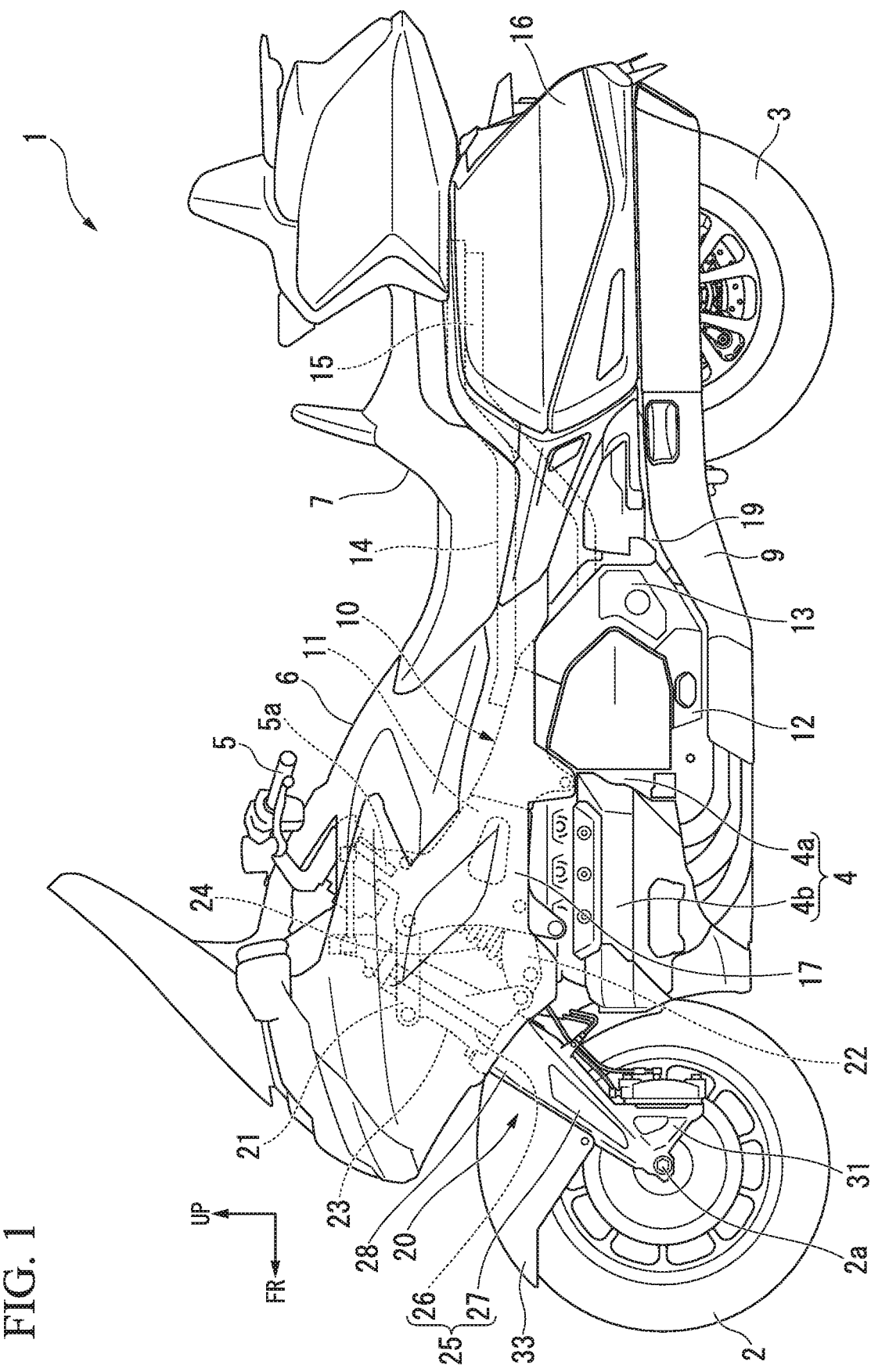
FIG. 1 is a left side view of a motorcycle according to an embodiment of the present invention.

Hereinafter, an embodiment of an aspect of the present invention will be described with reference to the accompanying drawings. Further, directions of forward-rearward, leftward, rightward, and the like described below are the same as directions in a vehicle described below unless the context clearly indicates otherwise. In addition, in appropriate places in the drawings used in the following description, an arrow FR showing a forward direction with respect to a vehicle, an arrow LH showing a leftward direction with respect to a vehicle and an arrow UP showing an upward direction with respect to a vehicle are provided.

<Entire Vehicle>

FIG. 1 shows a large-sized motorcycle 1 including a flat-six-cylinder engine 4 (a power source) provided between a front wheel 2 and a rear wheel 3 as a straddle-type vehicle. Hereinafter, the motorcycle may be simply referred to as "a vehicle."

The engine 4 is supported by a vehicle body frame 10. The vehicle body frame 10 includes main frames 11 configured to pivotably support a handle steering shaft 5a pivoted by a handle 5, a lower frame 12 attached to front lower sections of the main frames 11 and extending forward and rearward below the main frames 11, a pair of left and right pivot plates 13 extending and crossing between rear end portions of the main frames 11 and the lower frame 12 in an upward-downward direction, a pair of left and right seat rails 14 extending rearward from the rear end portions of the main frames 11, and a pair of left and right sub frames 15 extending rearward and upward from the pivot plates 13 and coupled to rear end portions of the seat rails 14.

The engine 4 is disposed below the main frames 11. The engine 4 is supported by the main frames 11 and the lower frame 12. The engine 4 includes a crank case 4a, and left and right cylinders 4b respectively protruding leftward and rightward from the crank case 4a. Three cylinder bores are formed in each of the left and right cylinders 4b in parallel in the forward-rearward direction, and pistons are slidably inserted into the cylinder bores.

A fuel tank 6 is disposed above the main frames 11. The fuel tank 6 extends rearward and downward from a front side along inclinations of the main frames 11. The fuel tank 6 is supported by the main frames 11. A seat 7 on which an occupant sits is disposed behind the fuel tank 6. The seat 7 is supported by the seat rails 14. An air cleaner box (not shown) is disposed between the left and right main frames 11 in a vehicle width direction and above the engine 4.

A front end portion of a rear swing arm 19 extending in the forward-rearward direction is rotatably supported by the pivot plates 13. The rear swing arm 19 is swingable in the upward-downward direction.

The rear wheel 3 is supported by a rear end portion of the rear swing arm 19. The rear swing arm 19 is disposed at the vehicle width direction inner side of an exhaust muffler 9 extending in the forward-rearward direction at a vehicle lower section. Left and right trunks 16 are installed on left and right sides of the rear wheel 3. Upper sides of the left and right cylinders 4b are covered with front side cowls 17 from the outside in the vehicle width direction.

<Front Suspension Mechanism>

A front suspension mechanism 20 is supported by front sections of the main frames 11.

The front suspension mechanism 20 includes an upper link 21, a lower link 22, a fork support section 23 (a holder), a front cushion unit 24 (a suspension) and a front swing arm 25.

Figure 2:
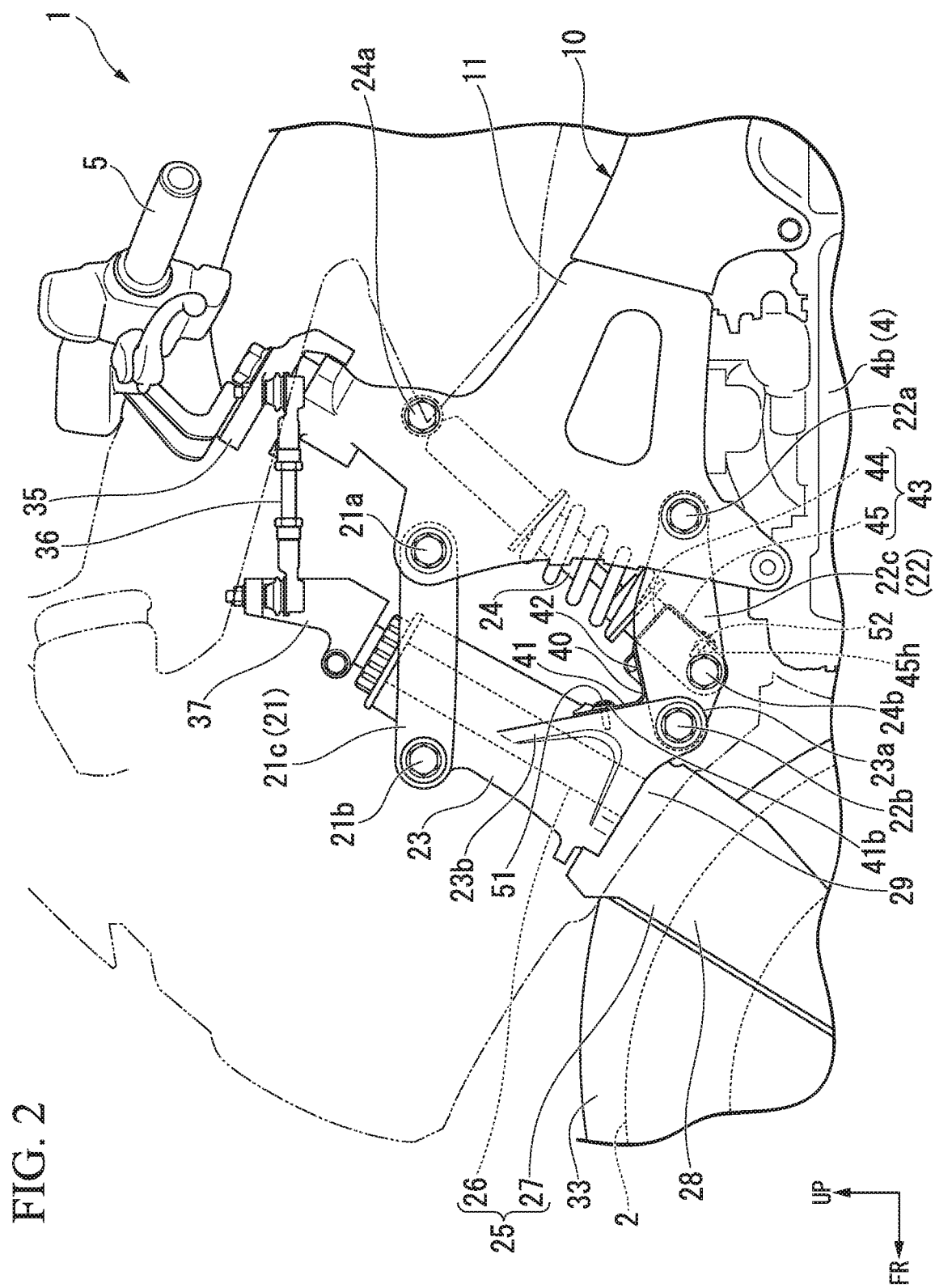
FIG. 2 is a left side view of a vehicle front section of the motorcycle.

As shown in FIG. 2, the upper link 21 and the lower link 22 are respectively disposed above and below the front sections of the main frames 11 with intervals. The upper link 21 and the lower link 22 are vertically swingably supported by the front sections of the main frames 11 via support shafts 21a and 22a, respectively. The upper link 21 and the lower link 22 are disposed to be substantially parallel to each other while extending in the forward-rearward direction.

The fork support section 23 is inclined rearward while being formed in a cylindrical shape. A front end portion of the upper link 21 is pivotably connected to an upper front section of the fork support section 23 via a support shaft 21b.

A front end portion of the lower link 22 is pivotably connected to a lower rear section of the fork support section 23 via a support shaft 22b.

An upper end portion of the front cushion unit 24 is swingably supported by the main frames 11 via a support shaft 24a. A lower end portion of the front cushion unit 24 is swingably supported by the lower link 22 via a support shaft 24b (a support shaft).

The front swing arm 25 is disposed so as to be inclined rearward. The front swing arm 25 includes a front wheel steering shaft 26 (a steering shaft) pivotably supported by the fork support section 23, and a fork section 27 integrally connected to a lower end portion of the front wheel steering shaft 26.

The front wheel steering shaft 26 is inserted through a fork shaft insertion hole formed in the fork support section 23. The front wheel steering shaft 26 is pivotably supported by the fork support section 23 while being inserted through the fork shaft insertion hole.

The fork section 27 includes a pair of left and right arm sections 28 extending upward and downward so as to be inclined rearward, and a bridge section 29 configured to integrally connect upper end portions of the left and right arm sections 28.

A front wheel axle 2a (see FIG. 1) configured to rotatably support the front wheel 2 is attached to lower end portions of the left and right arm sections 28. A lower end portion of the front wheel steering shaft 26 is attached to the bridge section 29.

As shown in FIG. 1, the arm sections 28 are formed in a tapered shape such that a side of the lower end portion is tapered. Front caliper support sections 31 are provided at rear sections of the lower end portions of the arm sections 28. A front fender 33 configured to cover an upper section of the front wheel 2 is attached to the arm sections 28.

As shown in FIG. 2, a lower connecting section 23a to which the front end portion of the lower link 22 is connected is formed on a rear lower section of the fork support section 23 to protrude rearward and downward. Ribs 23b configured to reinforce the lower connecting section 23a are formed on left and right side surfaces of the fork support section 23. The ribs 23b form a V shape that is open forward and upward when seen in a side view, and extend from the lower connecting section 23a to be branched off forward and upward such that a rib height is increased toward the lower connecting section 23a side.

Figure 3:
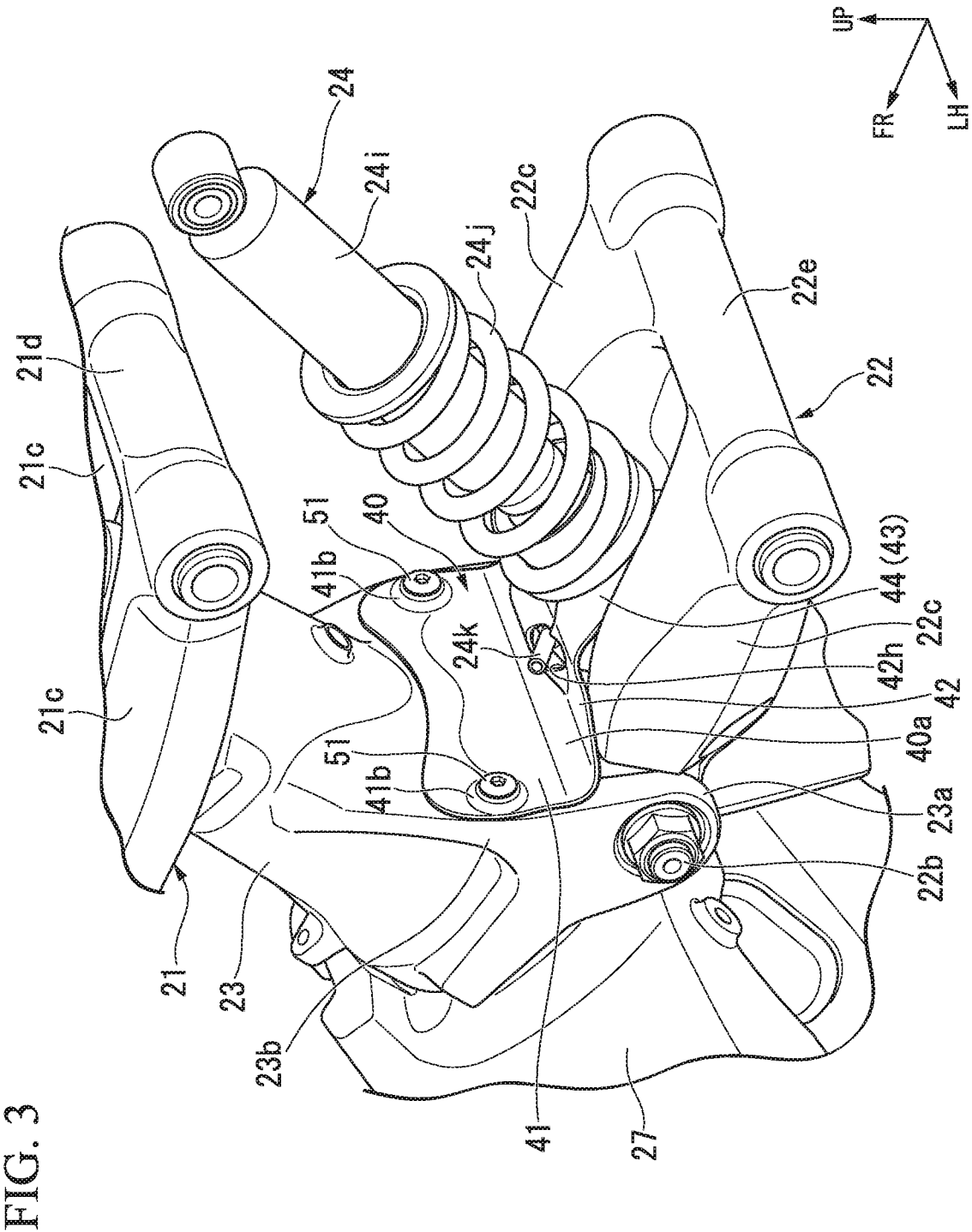
FIG. 3 is a perspective view of a front structure of the motorcycle when seen from a left rear side.

As shown in FIG. 3, the upper link 21 integrally has a pair of left and right upper arms 21c extending forward and rearward, and a cross member 21d configured to connect rear end portions of the left and right upper arms 21c. The left and right upper arms 21c are disposed on both of left and right sides of the upper section of the fork support section 23.

The lower link 22 integrally has a pair of left and right lower arms 22c extending forward and rearward, a front cross member 22d (see FIG. 5) configured to connect front end portions of the left and right lower arms 22c, and a rear cross member 22e configured to connect rear end portions of the left and right lower arms 22c. The left and right lower arms 22c are disposed on both of left and right sides of the lower section of the front cushion unit 24.

Figure 4:
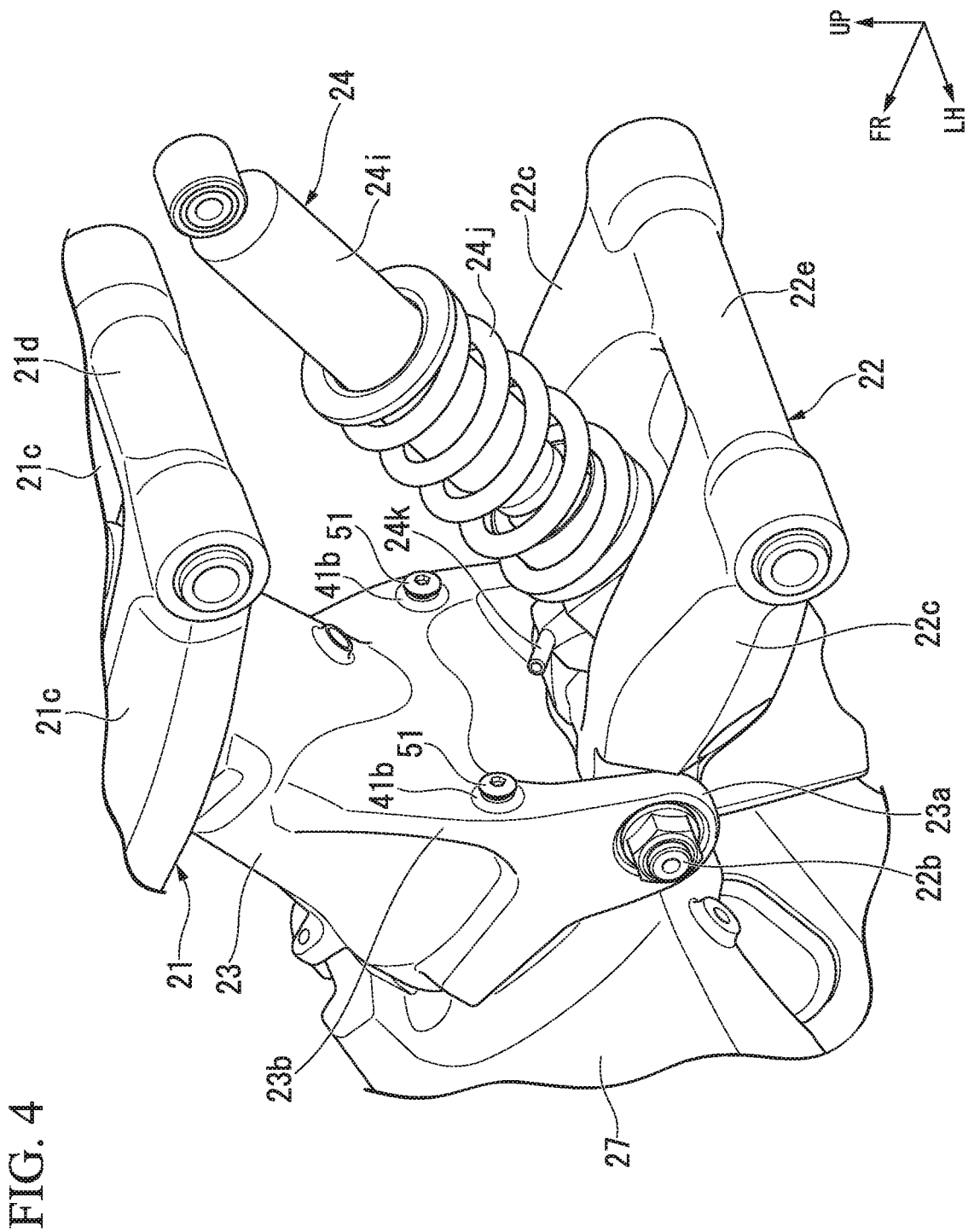
FIG. 4 is a perspective view showing a state in which a cover in FIG. 3 is removed.

As shown in FIG. 4, the front cushion unit 24 includes a rod type damper 24i that is inclined so that the more upper part thereof is positioned more rearward, a coil spring 24j wound around the damper 24i, and a connecting section 24k to which a cushion control wire (not shown) is connected. The front cushion unit 24 is an electronic control suspension having the connecting section 24k. The connecting section 24k protrudes leftward and upward from a front section of a lower end portion of the front cushion unit 24. For example, the connecting section 24k is connected to a motor driver, a battery, and so on (not shown), via a cushion control wire.

Figure 5:
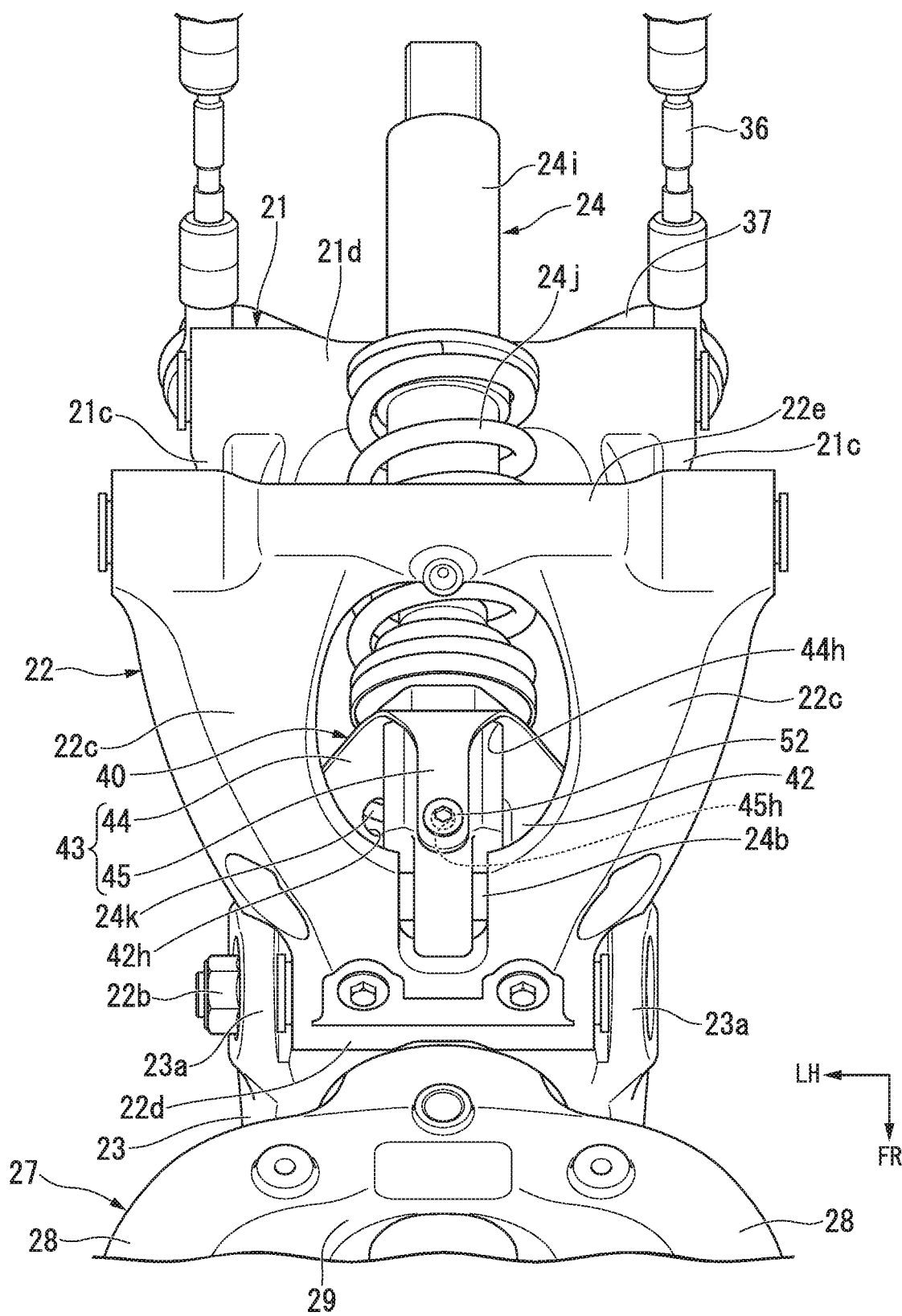
FIG. 5 is a bottom view of the front structure of the motorcycle.

When seen in the side view of FIG. 2, the front cushion unit 24 is disposed on a front upper side of the engine 4 and a rear upper side of the front wheel 2. The upper section of the front cushion unit 24 is covered with the main frames 11 from the outside in the vehicle width direction. As shown in FIG. 5, the front cushion unit 24 is supported by the support shaft 24b installed between the pair of left and right lower arms 22c.

In FIG. 2, reference numeral 35 designates a handle post to which the handle 5 is fixed, reference numeral 36 designates a steering system link having a rear end portion connected to the handle post 35, and reference numeral 37 designates a steering arm supported by the upper end portion of the front wheel steering shaft 26 and to which the front end portion of the steering system link 36 is connected.

<Cover>

As shown in FIG. 2, a cover 40 configured to cover a space between the pair of left and right arms 22c is installed between the front wheel steering shaft 26 and the front cushion unit 24. The cover 40 has flexibility. For example, the cover 40 is formed of an elastic body such as rubber or the like. As shown in FIG. 3, the front section of the cover 40 is fixed to the cylindrical fork support section 23 that pivotably supports the front wheel steering shaft 26 using a pair of left and right first bolts 51 (first fixing members). Specifically, the front section of the cover 40 is fixed to the fork support section 23 from behind using the pair of left and right first bolts 51. In the side view of FIG. 2, the front section of the cover 40 is fixed along the shape of a rib 23b.

As shown in FIG. 5, a suspension insertion hole 44h through which the front cushion unit 24 is inserted is formed in the cover 40. The rear section of the cover 40 is fixed to the front cushion unit 24 by a second bolt 52 (a second fixing member). Specifically, the rear section of the cover 40 is fixed to the front cushion unit 24 from behind by the second bolt 52.

As shown in FIG. 3, a bent section 40a bent along the fork support section 23 and the arms 22c is formed in the cover 40. A connecting section insertion hole 42h through which the connecting section 24k of the front cushion unit 24 is inserted is formed in the cover 40.

The cover 40 includes a first wide section 41 extending upward and downward along the rear section of the fork support section 23 and spreading in the vehicle width direction, a second wide section 42 extending rearward from the lower end of the first wide section 41 and spreading in the vehicle width direction to cover the upper surfaces of the pair of left and right arms 22c, and a rearward extension section 43 extending from the rear end of the second wide section 42 toward a rear end of the lower section of the front cushion unit 24.

Figure 6:
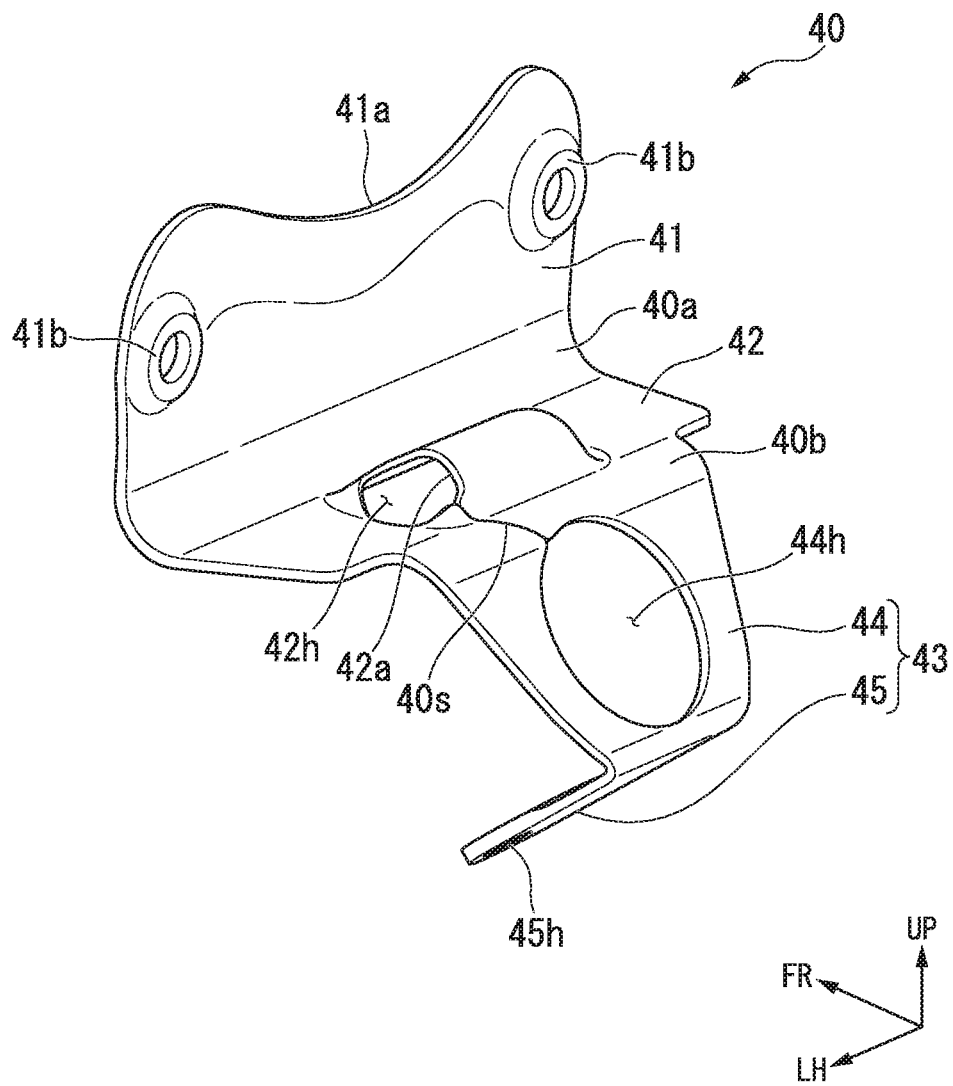
FIG. 6 is a perspective view of the cover when seen from a left rear side.

As shown in FIG. 6, the cover 40 is integrally formed of the same material. In the plan view of FIG. 7, an appearance of the cover 40 is bilaterally symmetrical. For example, the cover 40 is a molded article using a rubber material.

Figure 7:
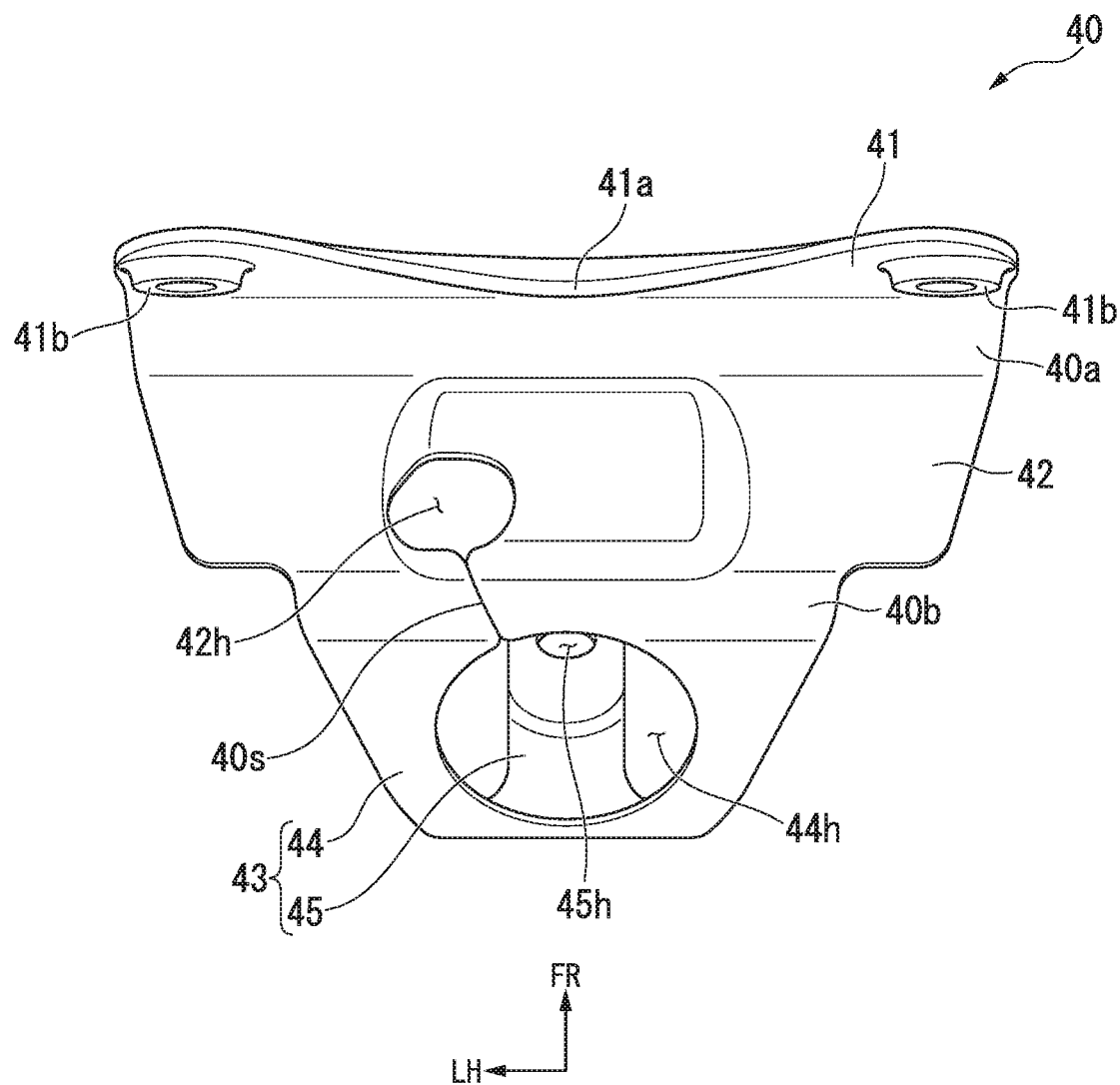
FIG. 7 is a plan view of the cover.

In the plan view of FIG. 7, the upper end portion of the first wide section 41 is curved along the rear section of the holder. In the front view of FIG. 8, a concave section 41a curved and recessed inward (downward) is formed in the upper end portion of the first wide section 41. As shown in FIG. 6, a first boss 41b formed in a cylindrical shape that is open such that the first bolts 51 (see FIG. 3) can be inserted therethrough is formed on an outer end portion of the first wide section 41 in the vehicle width direction. As shown in FIG. 7, the first boss 41b bulges rearward from the rear surface of the first wide section 41.

For example, as shown in FIG. 3, since the shaft section of the first bolt 51 is inserted through the opening of the first boss 41b and threadedly engaged with a female thread section (not shown) formed in the rib 23b, the front section of the cover 40 can be fixed to the fork support section 23 from behind.

Figure 9:
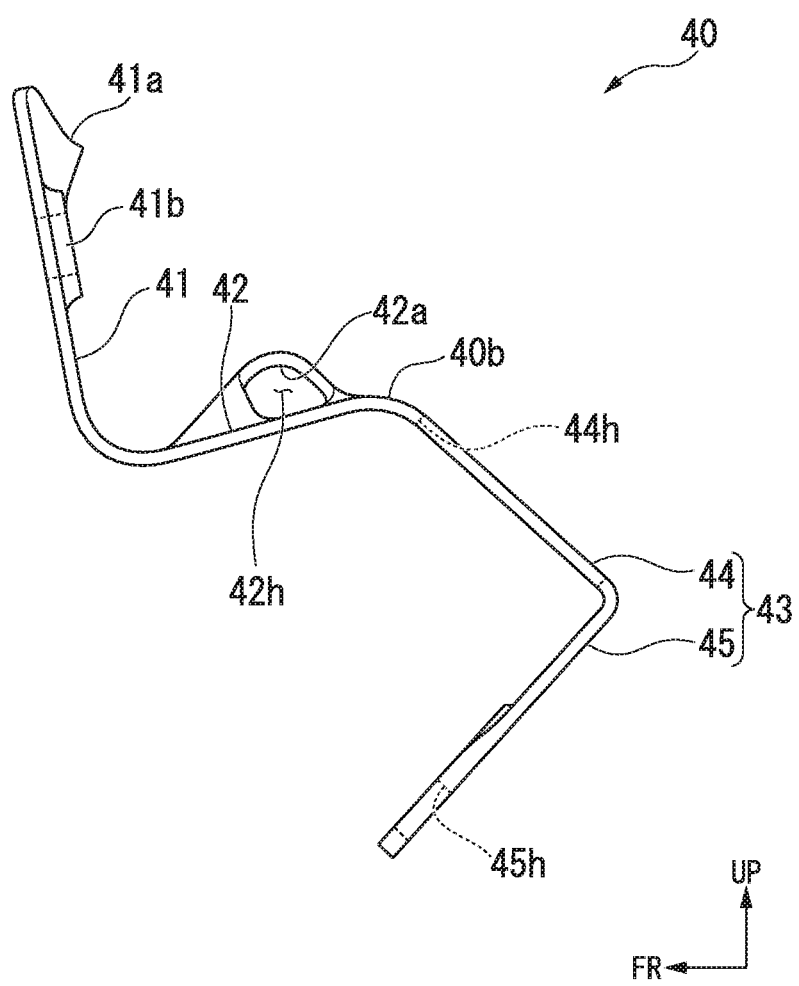
FIG. 9 is a left side view of the cover.

When seen in the side view of FIG. 9, the first wide section 41 and the second wide section 42 form an L shape. In the plan view of FIG. 7, an outer edge of the second wide section 42 in the vehicle width direction is inclined so that the more rearward part thereof is positioned more inward in the vehicle width direction. As shown in FIG. 9, an escape concave section 42a configured to avoid a lower end portion of the front cushion unit 24 (see FIG. 3) is formed in the second wide section 42. The connecting section insertion hole 42h comes in communication with the escape concave section 42a. In the plan view of FIG. 7, the connecting section insertion hole 42h is disposed at a left side position with respect to a center of the second wide section 42 in the vehicle width direction.

In the side view of FIG. 9, the rearward extension section 43 includes a first extension section 44 extending rearward and downward from a rear end of the second wide section 42, and a second extension section 45 extending forward and downward from a rear end of the first extension section 44. In the side view of FIG. 9, the first extension section 44 and the second extension section 45 form an L shape that is open forward. In the side view of FIG. 9, a curved section 40b curved to form a convex upward shape is formed between the second wide section 42 and the first extension section 44. In the side view of FIG. 2, the second extension section 45 extends in an axial direction of the front cushion unit 24.

As shown in FIG. 3, the first extension section 44 has a size that can be accommodated between the pair of left and right arms 22c in the vehicle width direction. In the plan view of FIG. 7, the outer edge of the first extension section 44 in the vehicle width direction is positioned further inward in the vehicle width direction than the outer edge of the second wide section 42 in the vehicle width direction. In the plan view of FIG. 7, the outer edge of the first extension section 44 in the vehicle width direction is inclined so that the more rearward part thereof is positioned more inward in the vehicle width direction.

The suspension insertion hole 44h having a circular shape is formed in the central section of the first extension section 44. A slit 40s configured to connect the suspension insertion hole 44h and the connecting section insertion hole 42h is formed in the curved section 40b between the second wide section 42 and the first extension section 44.

Figure 8:
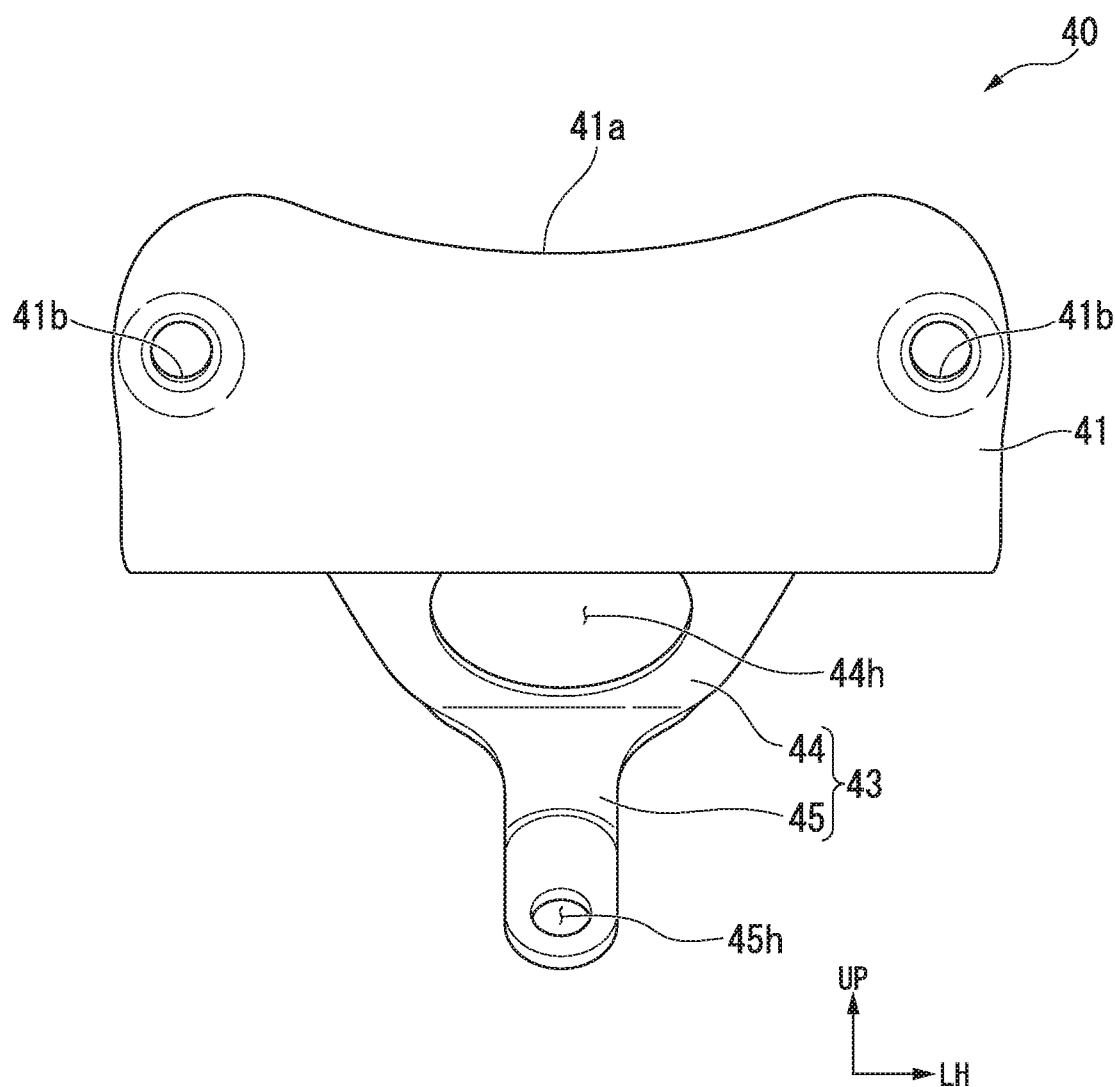
FIG. 8 is a front view of the cover.

As shown in FIG. 8, one lower section opening 45h that is open such that the second bolt 52 (see FIG. 5) can be inserted therethrough is formed in the lower end portion of the second extension section 45. For example, as shown in FIG. 5, since the shaft section of the second bolt 52 is inserted through the lower opening 45h of the second extension section 45 and threadedly engaged with the female thread section (not shown) of the lower end portion of the front cushion unit 24, the rear section of the cover 40 can be fixed to the lower end portion of the front cushion unit 24 from behind.

As described above, in the embodiment, in the front structure for the motorcycle 1 in which the front cushion unit 24 is disposed at a position behind the front wheel steering shaft 26 and above the engine 4, the front cushion unit 24 is supported by the support shaft 24b installed between the pair of left and right arms 22c and the cover 40 configured to cover a space between the pair of left and right arms 22c is installed between the front wheel steering shaft 26 and the front cushion unit 24.

According to the configuration, since the space between the pair of left and right arms 22c is hidden at a position in front of the front cushion unit 24 as the cover 40 configured to cover the space between the pair of left and right arms 22c is installed between the front wheel steering shaft 26 and the front cushion unit 24, appearance characteristics can be improved. In addition, since the gap between the pair of left and right arms 22c is covered with the cover 40, an airflow from the front can be suppressed from escaping downward through the space between the pair of left and right arms 22c. Since an increase in resistance is minimized by suppressing downward escaping of the airflow, aerodynamic performance can be improved. Accordingly, in the front structure for the motorcycle 1 in which the front cushion unit 24 is disposed behind the front wheel steering shaft 26 and above the vehicle body, appearance characteristics and aerodynamic performance can be improved.

In addition, in the embodiment, since the front section of the cover 40 is fixed to the fork support section 23 having a cylindrical shape and configured to pivotably support the front wheel steering shaft 26 by the first bolts 51, turning-up of the front section of the cover 40 due to traveling air can be minimized.

In addition, in the embodiment, since the front section of the cover 40 is fixed to the fork support section 23 from behind by the pair of left and right first bolts 51, the following effects are exhibited. Hypothetically, when the front section of the cover 40 is fixed to the fork support section from the front by the pair of left and right first bolts 51, an influence may be exerted on a flow of air from the front by the attachment portions of the first bolts 51 disposed on the front section of the fork support section, and a problem may occur in aerodynamic performance. On the other hand, when the front section of the cover 40 is fixed to the fork support section 23 from behind by the pair of left and right first bolts 51, it is unlikely that a flow of air from the front is influenced by the first bolts 51 disposed on the rear section of the fork support section 23. In addition, since the first bolts 51 can be fixed from the side of the cover 40, workability can be improved. In addition, in comparison with the case in which the front section of the cover 40 is fixed by only a single bolt, since the front section of the cover 40 can be firmly fixed to the fork support section 23, turning-up of the front section of the cover 40 due to the traveling airflow can be more effectively minimized.

In addition, in the embodiment, since the suspension insertion hole 44h through which the front cushion unit 24 is inserted is formed in the cover 40, the gap around the front cushion unit 24 can be made as small as possible by inserting the front cushion unit 24 through the suspension insertion hole 44h. Accordingly, appearance characteristics and aerodynamic performance can be further improved.

In addition, in the embodiment, since the rear section of the cover 40 is fixed to the front cushion unit 24 by the second bolt 52, it is possible to suppress flapping of the cover 40 due to traveling airflow.

In addition, in the embodiment, since the second bolt 52 can be fixed from the side of the cover 40 as the rear section of the cover 40 is fixed to the front cushion unit 24 from behind by the second bolt 52, workability can be improved.

In addition, in the embodiment, since the cover 40 follows movement of the arms 22c as the cover 40 has flexibility and the bent section 40a curved along the fork support section 23 and the arms 22c is formed in the cover 40, the gap generated upon swinging of the arms 22c can be covered with the cover 40. Accordingly, appearance characteristics and aerodynamic performance can be improved even when the arms 22c are swung.

In addition, in the embodiment, since the front cushion unit 24 is the electronic control suspension having the connecting section 24k and the connecting section insertion hole 42h through which the connecting section 24k is inserted is formed in the cover 40, the gap around the connecting section 24k can be made as small as possible by inserting the connecting section 24k through the connecting section insertion hole 42h. Accordingly, appearance characteristics and aerodynamic performance can be improved even in the electronic control suspension having the connecting section 24k.

In addition, in the embodiment, as the cover 40 includes the first wide section 41 spreading in the vehicle width direction while extending upward and downward along the rear section of the fork support section 23, the second wide section 42 spreading in the vehicle width direction to cover the upper surfaces of the pair of left and right arms 22c while extending rearward from the lower end of the first wide section 41 and the rearward extension section 43 extending from the rear end of the second wide section 42 toward the rear end of the lower section of the front cushion unit 24, since the gap around the front cushion unit 24 can be made as small as possible by the first wide section 41, the second wide section 42 and the rearward extension section 43, appearance characteristics can be further improved. In addition, since the gap between the upper surfaces of the pair of left and right arms 22c in the vehicle width direction is covered with the second wide section 42 and the airflow from the front can smoothly flow along the second wide section 42, aerodynamic performance can be further improved.

In addition, in the embodiment, since the rearward extension section 43 includes the first extension section 44 extending rearward and downward from the rear end of the second wide section 42 and the second extension section 45 extending forward and downward from the rear end of the first extension section 44, and the second extension section 45 extends along the front cushion unit 24 in the axial direction, the cover 40 can be attached regardless of expansion and contraction of the front cushion unit 24.

In addition, in the embodiment, since the arms 22c are the lower arms 22c extending in the vehicle forward-rearward direction while being connected to the lower section of the fork support section 23, appearance characteristics and aerodynamic performance around the lower arms 22c can be improved.

Further, while the example in which the front section of the cover 40 is fixed to the fork support section 23 by the pair of left and right first bolts 51 has been exemplarily described in the embodiment, there is no limitation thereto. For example, the front section of the cover 40 may be fixed to the fork support section 23 by one or a plurality of, i.e., three or more, bolts.

In addition, while the example in which the rear section of the cover 40 is fixed to the front cushion unit 24 by a single second bolt 52 has been exemplarily described in the embodiment, there is no limitation thereto. For example, the rear section of the cover 40 may be fixed to the front cushion unit 24 by the plurality of, i.e., two or more, bolts.

In addition, while the example in which the first fixing member and the second fixing member are bolts (fastening members) has been exemplarily described in the embodiment, there is no limitation thereto. For example, at least one of the first fixing member and the second fixing member may be another member such as a tape, a rivet, a clip, and so on.

In addition, while the example in which the front cushion unit 24 is the electronic control suspension having the connecting section 24k has been exemplarily described in the embodiment, there is no limitation thereto. For example, the front cushion unit 24 may be a conventional suspension in which the connecting section 24k is not provided. When the front cushion unit 24 is the conventional suspension, the connecting section insertion hole 42h may not be formed in the cover 40.

In addition, while the example in which the cover 40 includes the first wide section 41 spreading in the vehicle width direction while extending upward and downward along the rear section of the fork support section 23, the second wide section 42 spreading in the vehicle width direction to cover the upper surfaces of the pair of left and right arms 22c while extending rearward from the lower end of the first wide section 41 and the rearward extension section 43 extending from the rear end of the second wide section 42 toward the rear end of the lower section of the front cushion unit 24 has been exemplarily described in the embodiment, there is no limitation thereto. For example, the second wide section 42 may be widened in the vehicle width direction to cover the gap between the pair of left and right arms 22c in the vehicle width direction while extending rearward from the lower end of the first wide section 41. That is, the cover 40 may employ various shapes to cover the space between the pair of left and right arms 22c between the front wheel steering shaft 26 and the front cushion unit 24.

In addition, while the example in which the front fork is the front swing arm that constitutes the front suspension mechanism has been exemplarily described in the embodiment, there is no limitation thereto. For example, the front fork may be a telescopic-type front fork suspension (a front fork).

In addition, while the example in which the engine is a horizontal multi-cylinder engine has been exemplarily described in the embodiment, there is no limitation thereto. For example, the engine may be a parallel multi-cylinder engine or a single cylinder engine. That is, the engine may employ various types.

Further, the present invention is not limited to the embodiment, and for example, all vehicles on which a driver straddles and rides on the vehicle body are included as the straddle-type vehicle, and in addition to a motorcycle (including a motorized bicycle and a scooter type vehicle), a three-wheeled vehicle (also including a two-front-wheeled and one-rear-wheeled vehicle in addition to a one-front-wheeled and two-rear-wheeled vehicle) may also be included. In addition, the present invention may also be applied to a four-wheeled vehicle such as an automobile or the like in addition to a motorcycle.

While a preferred embodiment of the invention has been described and illustrated above, it should be understood that this is exemplary of the invention and is not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A front structure for a straddle-riding vehicle comprising:
    a suspension supported by a support shaft installed between a pair of left and right arms of a straddle-type vehicle while being disposed at a position behind a steering shaft of the straddle-type vehicle and above a power source of the straddle-type vehicle; and
    a cover that covers a space between the pair of left and right arms between the steering shaft and the suspension,
    wherein a front section of the cover is fixed to a cylindrical holder that pivotably supports the steering shaft by a first fixing member.

2. The front structure for a straddle-riding vehicle according to claim 1, wherein the front section of the cover is fixed to the holder from behind by a pair of left and right first fixing members.

3. The front structure for a straddle-riding vehicle according to claim 1, wherein a suspension insertion hole through which the suspension is inserted is formed in the cover.

4. The front structure for a straddle-riding vehicle according to claim 1, wherein a rear section of the cover is fixed to the suspension by a second fixing member.

5. The front structure for a straddle-riding vehicle according to claim 4, wherein the rear section of the cover is fixed to the suspension from behind by the second fixing member.

6. The front structure for a straddle-riding vehicle according to claim 1, wherein the cover has flexibility, and
    a bent section curved along the cylindrical holder, which is that pivotably supports the steering shaft, and one of the arms is formed in the cover.

7. The front structure for a straddle-riding vehicle according to claim 1, wherein the suspension is an electronic control suspension having a connecting section, and
    a connecting section insertion hole through which the connecting section is inserted is formed in the cover.

8. The front structure for a straddle-riding vehicle according to claim 1, wherein the cover comprises:
    a first wide section spreading in a vehicle width direction while extending upward and downward along a rear section of the cylindrical holder that pivotably supports the steering shaft;
    a second wide section spreading in the vehicle width direction to cover upper surfaces of the pair of left and right arms while extending rearward from a lower end of the first wide section; and
    a rearward extension section extending from a rear end of the second wide section toward a rear end of a lower section of the suspension.

9. The front structure for a straddle-riding vehicle according to claim 8, wherein the rearward extension section comprises:
    a first extension section extending rearward and downward from the rear end of the second wide section; and
    a second extension section extending forward and downward from a rear end of the first extension section, and
    the second extension section extends in an axial direction of the suspension.

10. The front structure for a straddle-riding vehicle according to claim 1, wherein one of the arms is a lower arm extending in a vehicle forward-rearward direction while being connected to a lower section of the cylindrical holder that pivotably supports the steering shaft.

* * * * *